Oct. 2, 1923.  
J. C. HEINEKE  
FOOT ACCELERATOR  
Filed Jan. 18, 1923
1,469,559
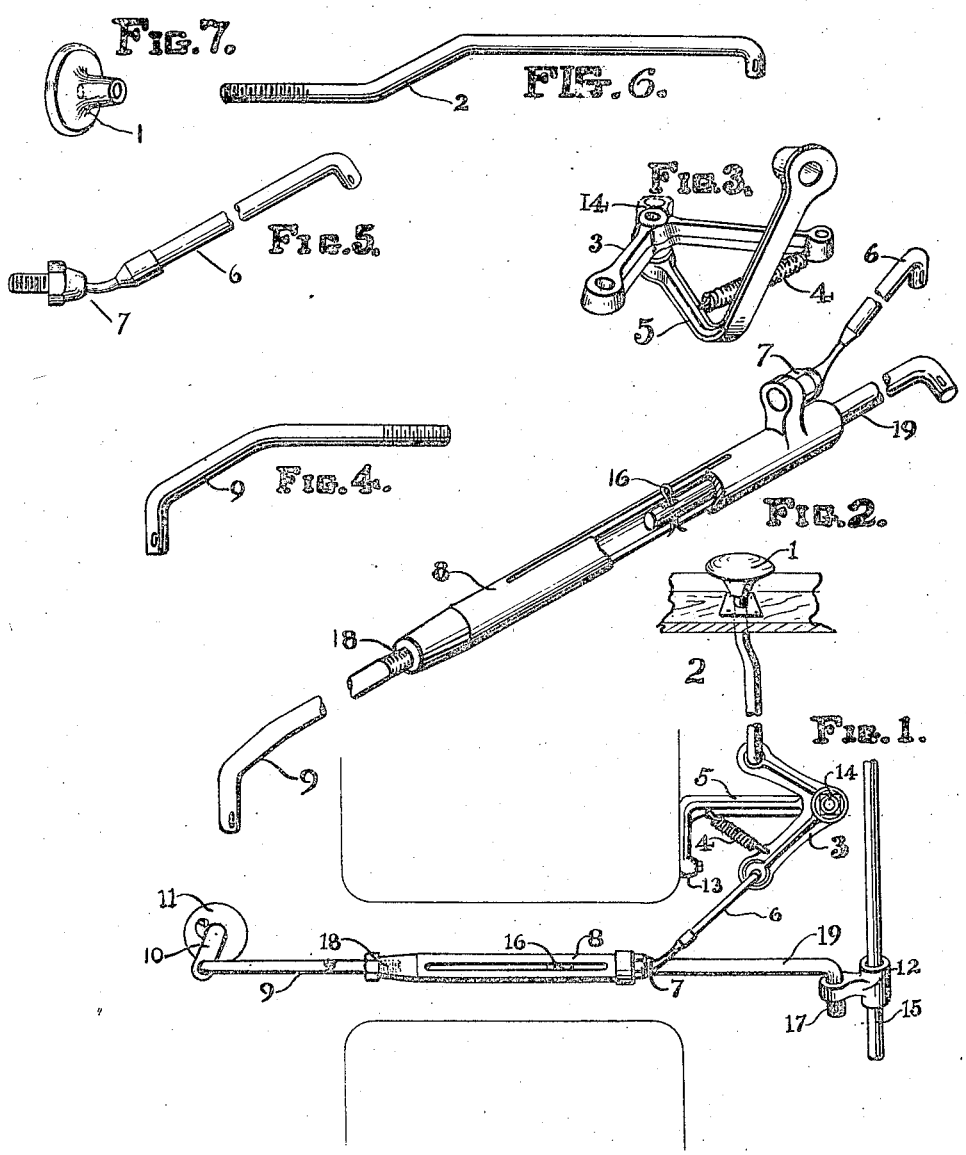
Witnesses:
1. Helen McCall
2. Edna Mabel McCall
John Heineke
INVENTOR.
BY A. B. McCall
ATTORNEYS.

Patented Oct. 2, 1923.

1,469,559

UNITED STATES PATENT OFFICE.

JOHN C. HEINEKE, OF SPRINGFIELD, ILLINOIS.

FOOT ACCELERATOR.

Application filed January 18, 1923. Serial No. 613,438.

*To all whom it may concern:*

Be it known that I, JOHN C. HEINEKE, a citizen of the United States, residing at Springfield, in the county of Sangamon and State of Illinois, have invented certain new and useful Improvements in Foot Accelerators, of which the following is a specification.

This invention relates to foot accelerators commonly used in connection with internal combustion engines as used with motor vehicles and the like.

The purposes of this invention therefore, are first, to provide an economic and simple means of controlling by foot pressure the gas feed of motor vehicles and the like.

A further object of my invention is to provide an apparatus that has in its construction provided for the elimination of all loose motion in its normal operation.

A further object of my invention is to provide a device that may be easily, economically and quickly assembled and attached to a motor vehicle as well as to be very easily repaired with a minimum of labor required.

The desired objects of my invention are attained by the foot accelerator described in the annexed specification, recited in the claims and illustrated in the accompanying drawings, in which like reference numerals indicate the same structural parts in the several figures.

Fig. 1 is a plan view of the assembled parts of the foot accelerator of my invention.

Fig. 2 is a perspective of the slotted sleeve shown as numeral 8 in Fig. 1. It will be observed in Fig. 2 that a vertical half section is shown of this slotted sleeve in part, in order to more clearly illustrate its construction. It will also be observed that the parts that are normally connected to this said slotted sleeve are shown in their respective normal operative position.

Fig. 3 is a perspective of the supporting bracket and bell-crank lever shown in Fig. 1 at numerals 5 and 3 respectively.

Fig. 4 is a perspective of the adjustable connecting rod shown in Fig. 1 at numeral 9.

Fig. 5 is a perspective of the ball and socket joint numeral 7 and connecting rod numeral 6 shown in Fig. 1 at these respective numerals. In this Fig. 5, these two detail parts are shown as they would normally be connected.

Fig. 6 is a push-rod which is shown at numeral 2 in Fig. 1.

Fig. 7 is a pedal-cap for the push-rod shown in Fig. 6 said pedal-cap being shown in Fig. 1 at numeral 1. This pedal-cap is adapted to receive the direct foot pressure of the operator when operating this accelerator.

The preferred embodiment of my invention is illustrated in the several figures above mentioned and the desired means of operating this foot accelerator will be clearly understood by carefully observing the figures given with the instructions which follow for normally operating the foot accelerator of my invention.

In view of the fact that the most common use for this invention would be in connection with the operation of motor vehicles, the manner of operation will be described as in control of a motor vehicle driver.

When the driver of a motor vehicle desires to increase the gas feed for the motor or accelerate the speed of the vehicle, he presses his foot on the pedal cap 1 in Fig. 1, his foot pressure is carried to the throttle of the vehicle carburetor illustrated at numeral 10 through the co-ordinating elements of the device as they normally operate in their respective position described as follows: A foot pressure on cap 1 is carried to the bell-crank lever 3 through push-rod 2. Bell-crank lever 3 is pivoted and secured into operative position by bolt 14. Through the peculiar design of bell-crank lever 3, a pressure with the foot on the pedal-cap causes bell-crank lever 3 to move about this pivot which is supported by bracket 5, which is in turn fastened to the motor block. When the foot pressure is applied the normal action of the bell-crank lever 3 causes a pull to be exerted on connecting rod 6 which is detachably secured to slotted sleeve 8, which in turn actuates the throttle 10 of carburetor 11. It will readily be observed that the foot pressure of the operator therefore causes the carburetor throttle to be open and thus increases the feed of gas to the motor.

The normal position of a carburetor throttle however is to be closed at least to the limit of closure desired by the operator which is set by the optional adjustment of the hand gas feed lever usually found on the steering wheel of a motor vehicle. In the normal operation of this foot accelerator whenever the operator releases his foot pressure, spring 4 automatically closes the throttle to a predetermined limit. This action in automatically closing the throttle to a predetermined limit, is accomplished in a manner described as follows: Connecting rod 19 is normally secured to lever 12 which is actuated by the hand control gas feed.

In the normal operation of this invention slotted sleeve 8 in its longitudinal movements rides connecting rod 19 and is limited on its longitudinal movement by cotter pin 16 which is set into a hole drilled through the loose end of connecting rod 19. This cotter pin therefore normally acts as a stop for the movement of slotted sleeve 8 in its normal action.

It will be observed that when the operator desires to set the hand control lever at a predetermined limit he adjusts his hand lever to the desired position and said adjustment is carried through rod 15 and lever 12 connecting rod 19 to which cotter pin 16 is secured and cotter pin 16 is thus optionally moved and set in a predetermined position thereby determining the limit of movement for slotted sleeve 8.

In this connection it will be observed that the operator is able to use the hand gas feed whenever he desires as well as the foot accelerator.

It will be observed that by using the hand lever, that the throttle is open through the normal action of connecting rod 19 in pulling cotter pin 16 back through the longitudinal slot in the slotted sleeve until it reaches the end of the slot and thus opens the throttle of the carburetor when the said cotter pin is pulled against the end of said slot.

It will be further observed that a ball and socket joint which is used to connect said slotted sleeve with connecting rod 6, permits normal action of these two elements when in operation.

It will be further observed that connecting rod 9 is screwed into the end of slotted sleeve 8 at 18, thus permitting a longitudinal adjustment to be made if desired.

It is obvious that certain minor details in the construction of my invention may be altered in their design and still stay within the spirit and scope of my invention. For instance I do not wish to be limited to the design illustrated of any one of the connecting rods or the push-rod used in this invention, nor do I wish to be limited to the design of coil tensile spring illustrated in the drawing, as it is obvious other resilient means might be used for the purpose shown and specified. Nor do I wish to be limited to the cotter pin as a stop means shown at numeral 16 Fig. 2, for the reason that it is obvious that other stop means equally effective might be used. I also wish not to be limited to the use of a ball and socket joint where such a joint is shown at numeral 7 as it is obvious that other means of securing similar results may be used. It may be readily observed that the manner of operation of the invention herein described, provides for the elimination of lost motion in lever controls which is a very desirable merit for any device of this character.

I call attention especially to the simple compact, firm and substantial manner in which the device of my invention is properly installed on a motor vehicle.

I call further attention to the neat, substantial and smooth manner in which longitudinally slotted sleeve 8 is mounted upon connecting rod 19 on which it is adapted to normally slide when actuated through the operator's foot pressure.

Having thus described the nature of my invention, what I claim as new and useful and desire to secure by Letters Patent is:

1. A foot accelerator co-operating with a hand control for a motor carburetor and comprising in combination a bracket supported bell-crank lever, a horizontal hand controlled throttle rod connected with a hand lever, a telescopically mounted longitudinally slotted tubular sleeve mounted on said hand control rod, means connecting said bell-crank lever with said sleeve, means for receiving and conveying foot pressure to said bell-crank lever, a tensile spring for automatically holding said bell-crank lever into normally closed position, and a rod connecting said sleeve with said carburetor as and for the purpose set forth.

2. An accelerator including a foot lever and pedal for conveying foot pressure, a throttle lever connected with a carburetor, a hand lever and hand controlled throttle rod, a tubular sleeve longitudinally slotted, slidably mounted on said hand controlled throttle rod and adjustably connected with said first throttle lever at one end and slidably supported on said hand controlled throttle rod at the other end, stop means provided in a detachably secured cotter pin in the sleeve supporting end of said hand throttle rod adapted to move within said longitudinal slot of said sleeve and limit the longitudinal movement thereof, and to pull against the end of said slot in the hand control of said carburetor, a bell-crank lever connected with said foot lever by one arm and supported by a motor mounted bracket, a ball and socket joint detachably secured to said sleeve at one end thereof, a connecting rod connecting the other arm of said bell-crank lever with said ball and socket joint, a tensile spring secured at one end to the bracket supporting said bell-crank lever and secured at the other end to said second arm of said bell-crank lever and adapted to automatically retract said carburetor control elements into a normally closed position, means for connecting said hand controlled throttle to said hand lever, thus comprising independent means for optionally controlling said carburetor by hand or foot without lost motion as and for the purpose set forth.

3. In an accelerator of the character described having hand controlled elements for regulating a carburetor, including a hand lever, a horizontal hand controlled throttle lever, a horizontally disposed hand controlled throttle lever, a tubular sleeve telescopically mounted on said horizontally disposed hand controlled throttle lever, a longitudinal slot in said sleeve to act as guide means for said sleeve, a connecting rod adjustably secured to said sleeve and connecting the same with said carburetor, means provided in a cotter pin in the end of said hand controlled throttle rod for pulling against the end of said longitudinal slot in said sleeve when actuated by said hand lever in the normal opening by hand of said carburetor, means provided in a tensile spring mounted on a bell-crank lever for automatically closing said carburetor feed when hand lever is released; and having foot control elements including a foot pedal, a bell-crank lever and a ball and socket joint, a push rod connecting said pedal with said bell-crank lever, a bracket supporting said bell-crank lever and secured to the side of a motor block, said ball and socket joint detachably secured to the aforesaid tubular sleeve, a connecting rod connecting one arm of said bell-crank lever with said ball and socket joint, the aforesaid spring adapted to also provide means for automatically holding said carburetor control in normally closed position after being actuated by foot pressure in opening said carburetor, thus providing means for independent action between said hand control and said foot control of carburetor.

In witness whereof I hereunto set my hand and seal this 12th day of January A. D. 1923.

JOHN C. HEINEKE. [L. s.]

Witnesses:
 Mrs. J. C. HEINEKE,
 GUY SAUNDERS.